April 3, 1951     C. L. KELSO     2,547,870
PIPE BENDING APPARATUS
Filed Dec. 4, 1947     6 Sheets-Sheet 2

FIG. 2

INVENTOR.
CLARENCE L. KELSO
BY
P. M. McKeight

April 3, 1951 C. L. KELSO 2,547,870
PIPE BENDING APPARATUS
Filed Dec. 4, 1947 6 Sheets-Sheet 3

INVENTOR.
CLARENCE L. KELSO
BY
C. M. McKnight

April 3, 1951     C. L. KELSO     2,547,870
PIPE BENDING APPARATUS

Filed Dec. 4, 1947     6 Sheets-Sheet 4

INVENTOR.
CLARENCE L. KELSO
BY
C. M. McKnight

April 3, 1951  C. L. KELSO  2,547,870
PIPE BENDING APPARATUS
Filed Dec. 4, 1947  6 Sheets-Sheet 6

INVENTOR.
CLARENCE L. KELSO
BY
C. M. McKnight

Patented Apr. 3, 1951

2,547,870

UNITED STATES PATENT OFFICE 2,547,870

PIPE-BENDING APPARATUS

Clarence L. Kelso, Oilton, Okla.

Application December 4, 1947, Serial No. 789,605

8 Claims. (Cl. 153—32)

This invention relates to a pipe bending machine, and more particularly but not by way of limitation to a portable bending machine that is utilized for the cold bending of large diameter thin wall pipe.

Heretofore in the laying of cross country pipe lines, it has been necessary to have the desired bent portions of the pipe formed at the mill, which must be transported and welded to the joining sections in the field. This has many disadvantages in that the proper degree of bend cannot always be predicted or computed, and difficulty is often experienced in connecting the pre-bent pipe with the joining sections, especially in the larger sized pipes, such as 24 to 36 inches. The present apparatus is generally concerned with the cold bending of large diameter thin wall pipe in such a manner that it will normally eliminate the use of any internal mandrel or jig for internally supporting the pipe during the bending operation. Furthermore, the present invention lends itself to the cold bending of large diameter pipe wherein a smooth bend on the inside of the pipe may be made, and without any distortion of the circular contour of the pipe, or the apparatus may be slightly modified to provide a wrinkle bend if so desired. The bending apparatus is utilized without the adoption of any preformed template or the like which has a tendency to limit or restrict the contour of the bend.

It is therefore an important object of this invention to provide a pipe bending machine adapted to anchor the pipe at one end and exert a lateral pull at the opposite end against a flexible pipe seating section, which permits a bending of the pipe for a smooth undistorted bend throughout the circumference of the pipe.

And still another object of this invention is to provide a pipe bending apparatus utilizing a bending section which will permit variations in the curvature of the bend, and is not limited or controlled in any manner by a preformed template co-operating with the bending section.

And still another object of this invention is to provide a portable bending apparatus having a bending section which is capable of variable adjustments in order to provide variable curvatures in a pipe section.

And still another object of this invention is to provide a pipe bending apparatus wherein the bending section maintains the outer periphery of the pipe in substantial circular configuration during the bending operation.

And another object of this invention is to provide a pipe bending apparatus having a bending section comprising a plurality of independent seating members which are flexibly mounted to permit a progressive bend in the pipe for any desired angularity, at the same time preventing any distortion of the pipe into an out-of-round or elliptical contour.

And still another object of this invention is to provide an apparatus for the cold bending of large sized pipe having a bending section including a plurality of resilient spring members permitting smooth bending of the pipe in response to a lateral pull at one end yet exerting a force opposite to the pull in order to provide a progressive bending of the pipe.

And still another object of this invention is to provide a pipe bending machine having a bending section with a series of pivotally mounted shoes adapted to support the pipe wherein a portion of said shoes are spaced from each other in such a manner as to provide a wrinkle on the inside of the pipe during the bending operation.

And another object of this invention is to provide a bending apparatus having a series of flexibly mounted pipe supporting shoes in a pipe bending machine wherein a portion of the shoes may be cut away to permit a wrinkle in the curvature of the pipe at the point of the cut away portion.

Other objects and advantages of the invention will be evident from the following detailed description, read in conjunction with the accompanying drawings, which illustrate my invention.

Figure 1:
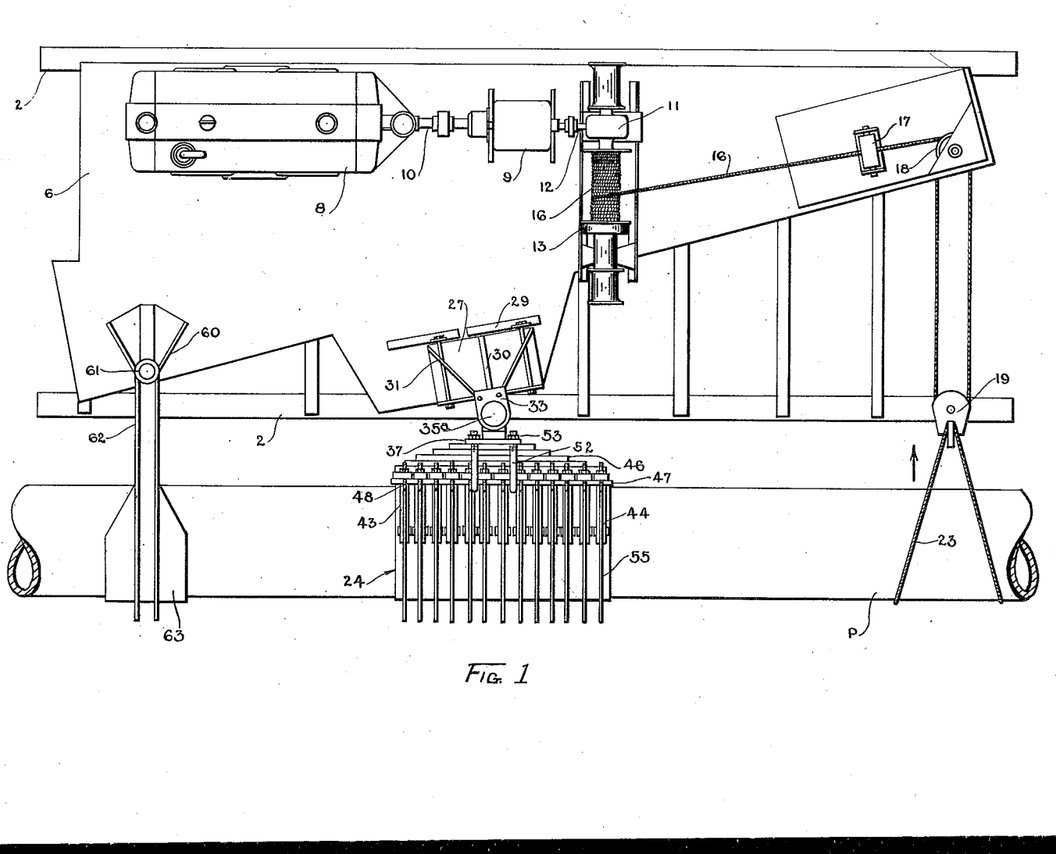
Figure 1 is a plan view of the preferred form of the apparatus.
Figure 2:
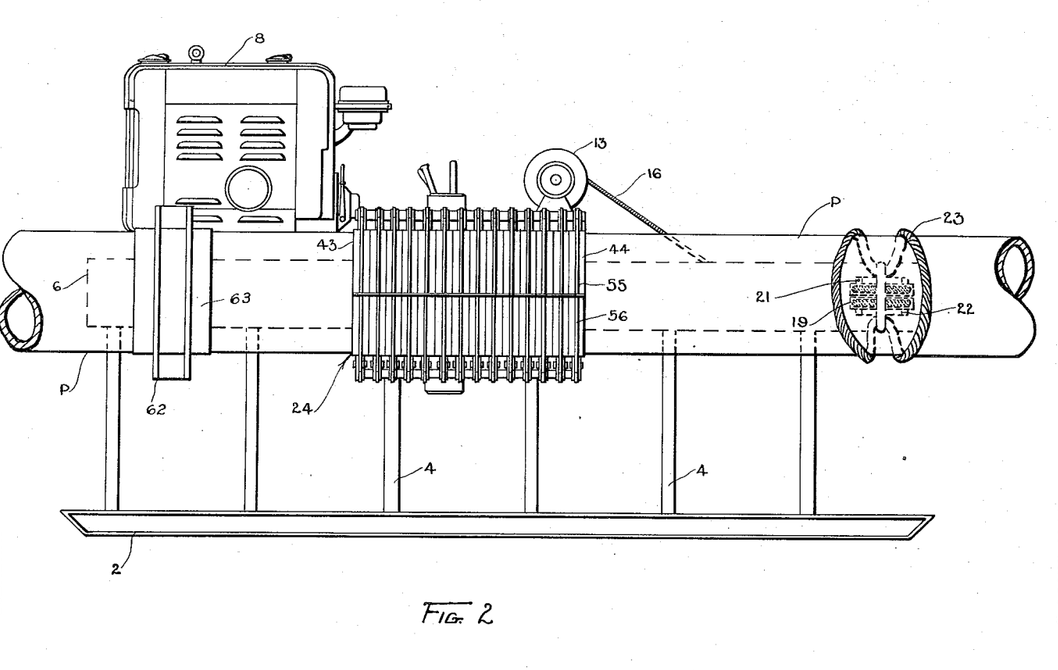
Figure 2 is a side elevation of the apparatus shown in Figure 1.
Figure 3:
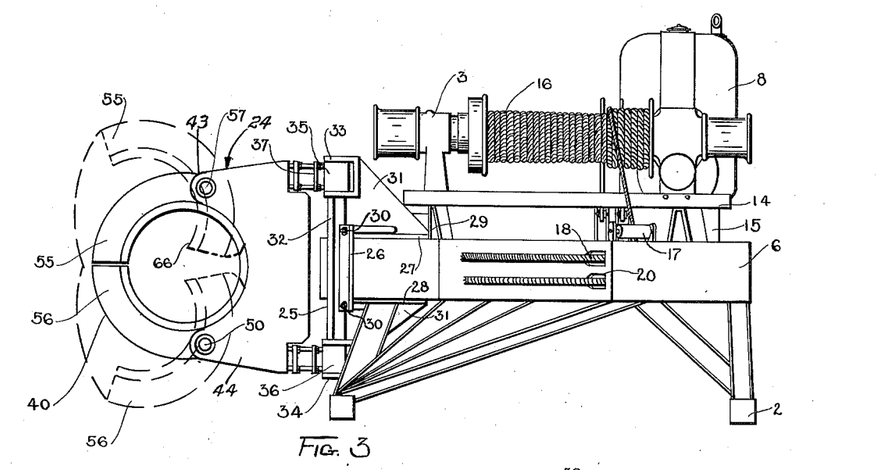
Figure 3 is an end elevation of the apparatus.

Referring to the drawings in detail, and more particularly to Figures 1 to 3, the pipe bending apparatus comprises a pair of horizontally spaced runners or skids 2 having a plurality of upstanding stud shafts 4 arranged in horizontal spaced relationship, and adapted to support a platform or bed 6. The platform 6 is adapted to support a plurality of elements necessary for the operation of the bending machine. A source of motive power, such as any suitable internal combustion engine 8 or the like, is mounted on the bed 6 and communicates (Fig. 1) with a transmission box 9 through an interconnecting shaft 10. The transmission box 9 in turn communicates with a reduction gear box 11 through an interconnecting shaft 12. The gear box 11 is connected in any suitable manner with a conventional type winch 13 disposed on the bed 6 in right-angled relationship with the motor 8 and the transmission box 9. The winch 13 is mounted on a base 14 (Fig. 3) which is provided with a plurality of legs or feet 15 for supporting the winch on the platform 6. Any suitable cable or wedge rope 16 is wound around the winch 13 and extends outwardly therefrom past a guide roller 17, and around a pulley 18 into connection with a traveling block 19. The cable extends from the traveling block back through a lower pulley 20 disposed immediately beneath the upper pulley 18 (Fig. 3) where it may be anchored in any suitable manner (not shown) to the frame of the machine. The traveling block 19 is preferably supported by any suitable boom apparatus (not shown) disposed adjacent the machine. The traveling block 19 is provided with upper and lower plates 21 and 22 adapted to receive a sling line 23 extending around the outer periphery of the pipe P to be bent in a manner to be hereinafter set forth.

It will be apparent that the winch 18 may be rotated by the engine 8 to cause the cable 16 and the sling line 23 to be brought into a taut condition relative to the pipe P. Continued rotation of the winch will move the traveling block 19, cable 16 and sling line 23 to exert a force or lateral pull at one end of the pipe opposite an anchored end of the pipe as will be hereinafter set forth.

As disclosed in Figure 3, the bending apparatus is preferably secured to one side of the bed 6 and the bending shoe assembly generally indicated at 24 comprises a trunnion bracket member 25 of substantially U-shape having a front leg 26 and outwardly extending upper and lower legs 27 and 28 wherein said upper front and lower leg members are adapted to be disposed around the outer periphery of the bed 6 at one side thereof. The bed 6 is provided with an upstanding flange 29 fixed thereto and having a plurality of apertures (not shown) for a purpose as will be hereinafter set forth. A downwardly extending similar flange (not shown) extends from the under-face of the platform 6. The U-shaped bracket surrounding the side of the platform 6 is connected to the flanges 29 through a plurality of strap members or bolts 30 thereby providing a horizontally adjustable yoke connection for the bracket member 25. The horizontally disposed trunnion legs 27 and 28 have outwardly extending reinforcing plates 31. From the foregoing it will be apparent that the trunnion member 25 may be slidably adjusted along the frame bed 6. The front plate 26 of the trunnion 25 is disposed adjacent a vertically disposed plate member 32 having upper and lower enlarged recessed members 33 and 34 connecting with the plates 31 and each adapted to receive a pivotable bearing member 35 and 36 (Figs. 1 and 3). The bearing members 35 and 36 (Figs. 5 and 6) are each provided with an integral plate 37 having a plurality of bolt receiving apertures 38. The substantially T-shaped bearing and plate is pivotally connected to the recessed members 33 and 34 through any suitable shaft means 35a.

The bending shoe assembly 24 is adapted to be disposed immediately adjacent the trunnion and bearing members, as clearly shown in Figure 3. Furthermore, the plate 37 provides a means for connecting the pivotable bearings with the bending shoe assembly as will be hereinafter set forth.

Figures 4, 5, 6:
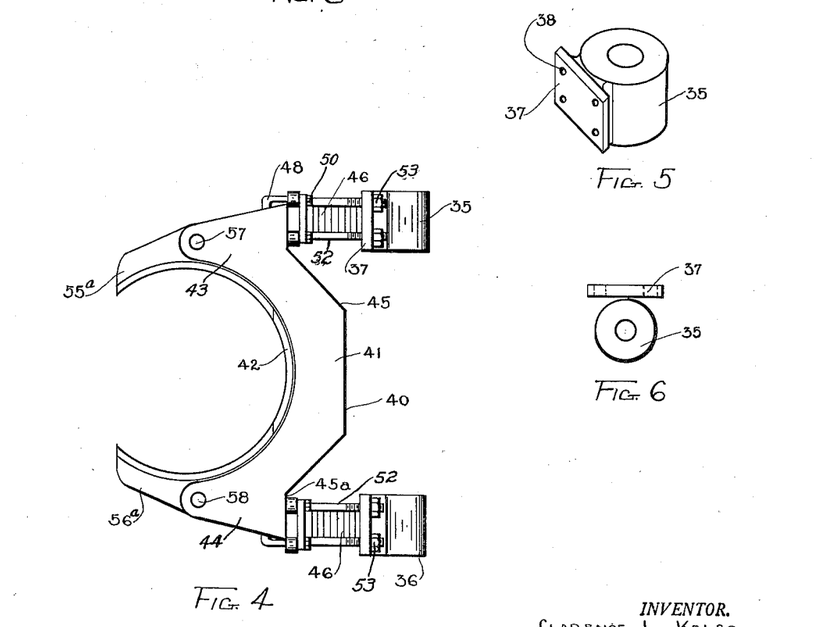
Figure 4 is a detailed view in end elevation of the pipe bending section.
Figure 5 is a detailed view in perspective of the bearing plate, showing a modification of the outside pivotal clamps of shorter length.
Figure 6 is a similar view in plan.
Figure 7:
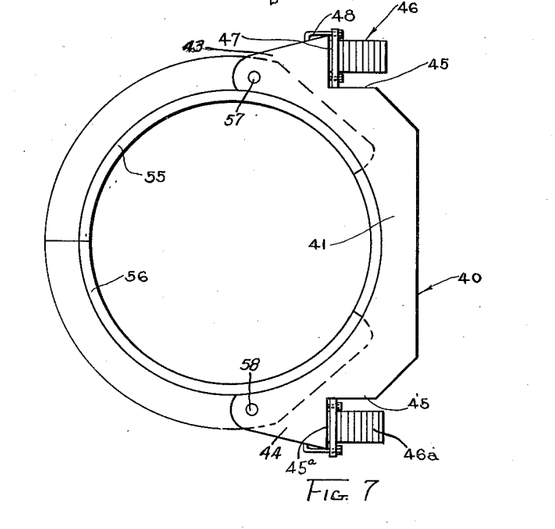
Figure 7 is a view similar to Figure 4 showing the longer length for the outside pivotal clamps of the bending section.
Figure 8:
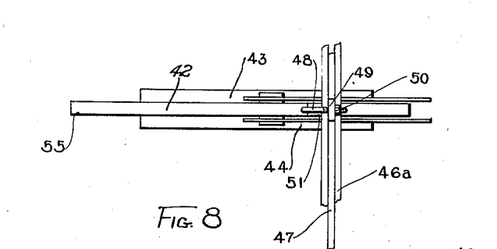
Figure 8 is a top view of the bending shoe shown in Figure 7.

Referring to Figures 1 to 3 inclusive, it will be apparent that the shoe assembly 24 comprises a plurality of individual transversely disposed shoe members 40, wherein each shoe member comprises a substantially semi-circular seating portion 41. The semi-circular seating portion is preferably solid, and is provided with oppositely extending bifurcated plate portions 43 and 44 having a contour substantially on the arc of a circle as disclosed in Figs. 4, 7 and 8, and providing a slot 42. The semi-circular solid portion 41 of each shoe is provided with a rear cut away portion 45 at both the upper and lower extremities thereof, each adapted to receive a plurality or set of horizontally disposed spring members indicated generally at 46 (Figs. 4 and 7). The spring members comprise a longer spring 47 adapted to be disposed in the upper and lower cut away portions 45 and adjacent the flat face 45a.

The spring 47 is secured to each of the plurality of individual shoe members by a plurality of U-bolts 48 wherein each U-bolt 48 for each shoe member 40 is disposed between the bifurcated portions 43 and 44 for each shoe portion 41 and circumvents a spacer 51 welded in the slot 42 between the members 43 and 44. The bolt 48 also surrounds the spring 47 for connection with an apertured tie plate 49 by the nuts 50. Note (Figs. 7, 8, 11 and 12). It will be apparent that this type of connection is provided for each of the individual shoe members 40 of the shoe assembly 24. As clearly shown in Figures 1 and 7, the plurality of separate and additional springs 46a are disposed at one side of spring 47 and are imposed in contact with each other in successive relationship. The springs 46a may be of any preferred number and are of diminishing length relative to the longer spring 47, particularly the length diminishes as each successive spring approaches the flanges plate 37 of the bearing members 35 and 36. It will be apparent from Figures 3 and 7 that the springs 46 are disposed at both the upper and lower extremities of the semi-circular member 41 for connection with the upper and lower bearings 35 and 36 through plates 37.

As clearly shown in Figure 1, a pair of spaced U-bolts 52 surround each set of springs 46 as well as spring 47 and are connected with the plate 37 through the nuts 53. The connecting relationship of the spring 47 with the plurality of individual shoe members provide for the positive connection of the remaining springs 46a with the plate 37 of the pivotable bearings 35 and 36 at both the upper and lower extremities of the semi-circular shoe members 41. Furthermore, it will be apparent that the bending shoe assembly is capable of considerable flexibility due to the individual shoes 40 and the resiliency of the steel springs co-operating therewith, as will be hereinafter set forth.

Each of the individual semi-circular shoe portions 41 is provided with a pair of arcuately shaped members 55 and 56 pivotally secured substantially in proximity of the outer extremities of the member 41 through the pivot pins 57 and 58, as clearly shown in Figures 3, 4 and 7.

At a point transversely spaced from the bending section 24, the platform 6 is adapted to receive a second bracket member 60 similar in structure to that of the bracket 25 (Fig. 1). The bracket 60 is provided with upper and lower pivotable bearings 61 (only one of which is shown) which in turn are connected with a U-shaped strap member 62 adapted for anchoring one end of the pipe P. The strap member 62 is provided with a semi-circular portion 63 acting as a holding shoe against the outside portion of the pipe P. It is preferable, but not limited thereto, to provide an insert or a plurality of semi-circular insert shoes (not shown) in order to permit the anchoring or seating of the variable sized pipe desired to be bent.

*Operation*

In the bending operation a section of pipe to be bent is placed in the stationary shoe 62 and extends through the plurality of transversely disposed individual shoes 41 forming the bending section 24 which may be of any desired number, depending largely on the spread or curvature of bend required. The pipe P seats both in the anchoring shoe 62, and the bending section 24 and extends outwardly into contact with the sling 23. It will be apparent that the pivotable members 55 and 56 may be moved to open position as shown in the dotted lines in Figure 3 to allow insertion of the pipe P into bearing contact with the back plate or solid semi-circular seating portion 41. As the pipe moves inwardly or approaches the solid portion 41 it will contact the inner ends 66 of the pivotable members 55 and 56 causing them to close and thereby encircle the pipe as shown in the full lines in Figure 3, and also in Figure 7. With the pipe in seating position in the bending section and the sling member 23 circumventing the pipe, the winch 13 is rotated by the engine 8 to cause a lateral pull on the end of the pipe P by the cable 16 and thereby causing a movement in the direction as shown by the arrow in Figure 1. The force exerted on the pipe by the cable 16, and the sling 23 is against the anchored position of the pipe in the stationary shoe 62 to cause a bending of the pipe at the position of the bending section 24.

The plurality of individual shoes 41 support the contour of the pipe to maintain its substantially circular cross-section during the bending operation. Furthermore, during the lateral pull on the end of the pipe, it will be apparent that the portion of the pipe seated in the bending section 24 is permitted to bend progressively due to the flexibility of the individual shoe members 41, and the resiliency of the sets of springs 46 which are arranged in successive diminishing lengths. It will thus be apparent that if a slight bend is desired, only the longer spring such as indicated at 47 and a few of the additional springs may be desired. Furthermore, the bending stresses along the length of the pipe are subject to the opposed resilient force of the plurality of springs 46, and the arrangement is such that the longer springs exert less resilience against the lateral pull, yet permitting a slight bend or curvature as desired. However, continued bending of the pipe progressively causes a reaction of the remaining springs of shorter length to provide an increasing resilience against the lateral pull, yet at the same time affording enough elasticity to permit a bend of substantial curvature. The seating shoe 41 provides for a smooth and even contour on the inside of the bend. Simultaneously the pivotable leg members 55 and 56 bear against the outside of the pipe at a point diametrically opposite the seating portion 41 and cooperate therewith to provide a complete circular seating surface for the overall circumference of the pipe to assure that the bending of the pipe may be made without any distortions or elongations at any point within its circular contour. It will be apparent that any number of springs 46 may be utilized and where a slight curvature or bend is required, it may only be necessary to use one or two springs while for a more critical bend, it will be desirable to use an increasing number of springs of variable length.

Figures 10, 11, 12, 13, 14:
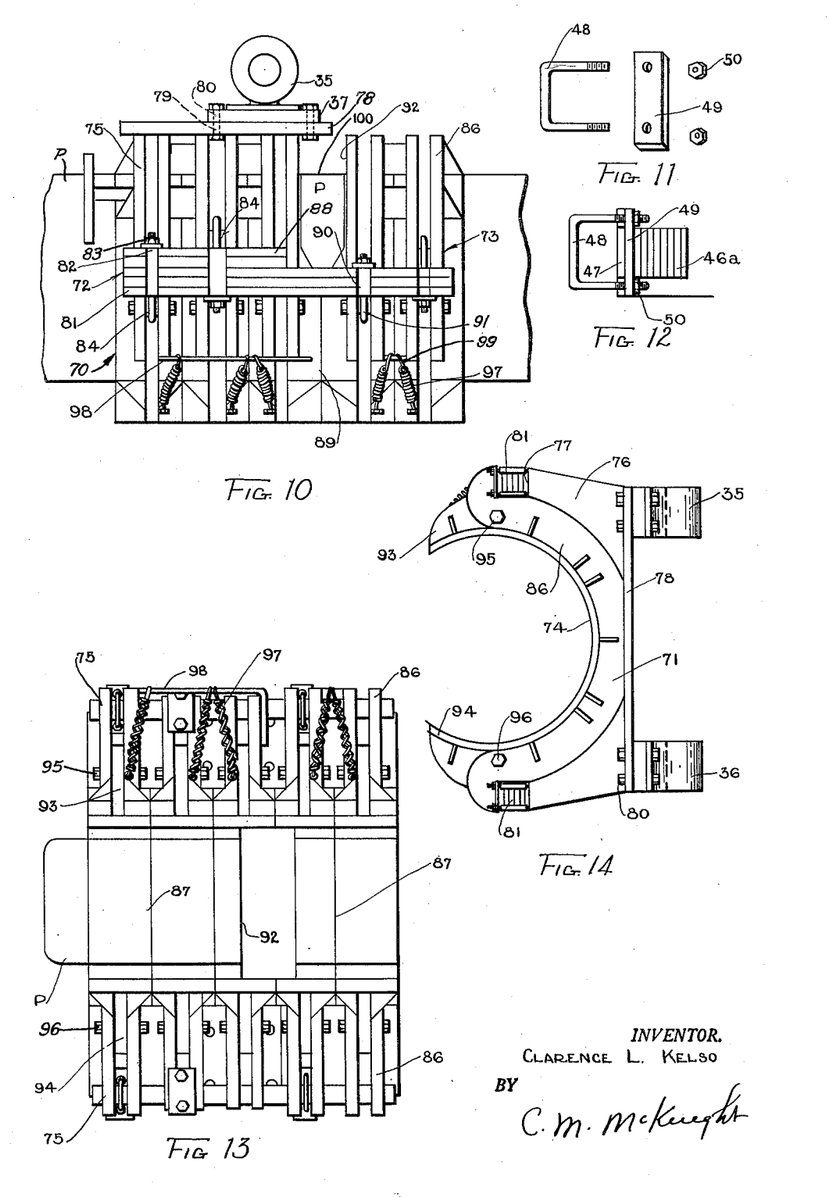
Figure 10 is a top view of a modified form of the bending section.
Figure 11 is a detailed view showing a disassembled relation of the connection means between the springs and the seating shoes.
Figure 12 is a similar view showing the parts in assembled relation.
Figure 13 is a front view of the modified bending section shown in Figure 10.
Figure 14 is a side view thereof.

In Figures 10, 13 and 14 is shown a modification of the bending section of the apparatus, in order to provide a wrinkle bend in the pipe in lieu of a smooth bend as in the preferred embodiment. The modified bending section, generally indicated at 70, comprises two sets of a plurality of semi-circular shoe members 71 connected transversely by welding as distinguished from the plurality of independent shoes disclosed in the preferred embodiment.

The bending section 70 is segmental in that it provides a stationary shoe section 72 and a flexible shoe section 73. The shoe section 70 comprises a semi-circular seating portion 74 formed from a pair of spaced plate members 75 having a configuration in side elevation substantially as shown in Figure 14. The plate members 75 and particularly the semi-circular portion 74 is provided with an extended back portion 76 having a groove or cutaway portion 77 at both the top and bottom thereof for receiving the springs as will be hereinafter set forth. The rear portion of the back plate 76 is adapted to have a plate 78 welded thereto for securing the shoe section 72 to plate 37 of the upper and lower bearings 35 and 36, as in the preferred embodiment. The plate 78 is provided with a plurality of apertures 79 adapted to receive bolts 80 for connecting the plate 78 with the plates 37 of the upper and lower bearings 35 and 36. Spring members 81 are disposed in the groove 77 and secured therein by a plurality of U-bolts 82 disposed between the spaced plates 75 and surrounding the spring members and co-operating tie plates 84 welded between the bifurcated plates 75, as clearly shown in Figure 10. It will be apparent from Figure 10 that the first few springs 81 extend beyond the shoe section 72, while the additional springs 88 are of shorter length and are confined in length to the transverse length of the shoe section 72.

The shoe section 73 comprises a plurality of shoes welded together in the same manner as that of section 72, however they are not connected in any manner with the plates 37 of the bearings 35 and 36. The shoe section 73 comprises a plurality of spaced plates 86 having a substantially semi-circular configuration as that shown in Figure 14. The reinforcing or connecting back plate 76 of shoe section 72 is omitted for seating section 73. The individual spaced plates comprising the segmental seating section are preferably welded at 87 in order to provide the separate solid shoe sections 72 and 73. The shoe section 73 is adapted to be disposed flush or adjacent the shoe section 72 as at 89 but completely separate therefrom. Furthermore, the shoe section 73 is held in position and secured to the longer leaf springs 81 by the bolt 90 disposed between plates 86 and circumventing the springs and a welded tie plate 91, as shown in Figure 10. It will be apparent that the relationship of the section 72 with 73 is thus to leave a space 92 there-between for a purpose as will be hereinafter set forth. Each pair of co-operating plates 75 and 86 are provided with curved clamping members 93 and 94 pivoted at 95 and 96 at the upper and lower extended portions of the semi-circular plates 75 and 86 respectively. The pivotal clamping members 93 and 94 are not of such length to provide a complete closure as in the preferred embodiment (Fig. 7), but however, assist in maintaining the pipe with a circular cross section during the bending operation in the same manner as in Fig. 4.

A plurality of helical springs 97 are anchored at one end to the top pivotable members 93 and at the opposite end to a transverse bar 98 disposed at the top of the shoe section 72 and a similar bar 99 for shoe section 73. The helical springs 97 merely maintain the upper curved members 93 in open position with the semi-circular bending section 70. However, it will be apparent that as the pipe moves inwardly the members 93 and 94 will close partially around the pipe to prevent any distortion thereof as heretofore mentioned.

It will be apparent that the longer or extended springs 81 permit a pivoting or bending of the shoe section 73 relative to the stationary shoe section 72 acting as a fulcrum. With the bending assembly 70 utilized with the apparatus as disclosed in the preferred embodiment, a lateral pull on the end of the pipe from the sling 23 will cause the shoe section 73 to bend against the resistance and resilience of the springs 81 to provide a curvature therein. Furthermore, the space or recessed portion 92 between the shoe sections 72 and 73 permits the pipe P disposed in this space 92 to be wrinkled (not shown) at 100, in order to provide a wrinkle bend for the pipe. Wrinkle bends are sometimes preferred because of the rapidity by which they can be made, and at the same time assure that there is not any substantial elongation of the metal, and consequent structural strength loss. It will be apparent from Figures 10, 13 and 14, that the space 92 may be varied as desired. Furthermore, that any number of springs may be utilized with the bending sections 72 and 73, and the extended or longer springs 81 may be of any desired length, according to the curvature or bend desired in the pipe. The springs 88 and extended springs 81 operate as in the preferred embodiment, in that they provide for resilient reaction or resistance to the lateral pull, to provide a bending of the pipe on an even and progressive contour without any utilization of a preformed template to determine the degree or angle of bend. Furthermore, the bending assembly utilized in both embodiments does not utilize any internal jigs, mandrels or the like in order to support the pipe internally during the bending operation to assure a smooth bend without any "egging" or distortion of the pipe from its normal circular cross section.

Alluding further to Figures 4 and 7, it will be apparent that the only substantial modification is in the pivotable members 55 and 56. In Figure 4 the arcuately shaped pivotable members 55a and 56a are not as great a length as the pivotable members 55 and 56 in Figure 7. It has been found in practice that the pivotable members co-operating with the semi-circular seating portion 41 of the bending assembly will assist materially in preventing any "egging out" or distortion of the pipe during the bending operation. In some instances a completely encircled pipe is necessary, particularly where a large degree of bend is required, however, in most instances the shorter arcuately shaped pivotable members are sufficient to preclude any distortion or elliptical configuration of the pipe during the bending operation.

From the foregoing it will be apparent that the present apparatus provides for the cold bending of large sized pipe in an efficient and expeditious manner, and particularly utilizing a constant resilient force reacting against the bending pull on the pipe, wherein said resilient force can be adjusted or varied through the utilization of a plurality of springs of varying lengths dependent upon the size or degree of bend desired. Furthermore, the individual semi-circular shoe members co-operate with the resilient springs to provide a progressive bending action or curved contour during the bending operation which can be performed without the use of any preformed template of a predetermined curvature with which the bend must conform. Furthermore, the use of any internal jigs or mandrels to preclude distortion of the pipe during the bending operation is eliminated through the substantially over-all support of the circumferential contour of the pipe during the bending operation. It will be apparent that the present apparatus can be utilized for the cold bending of pipe irrespective of whether it is desired to provide a smooth bend or curvature, or wrinkle bend as is shown in the preferred embodiment.

Figure 9:
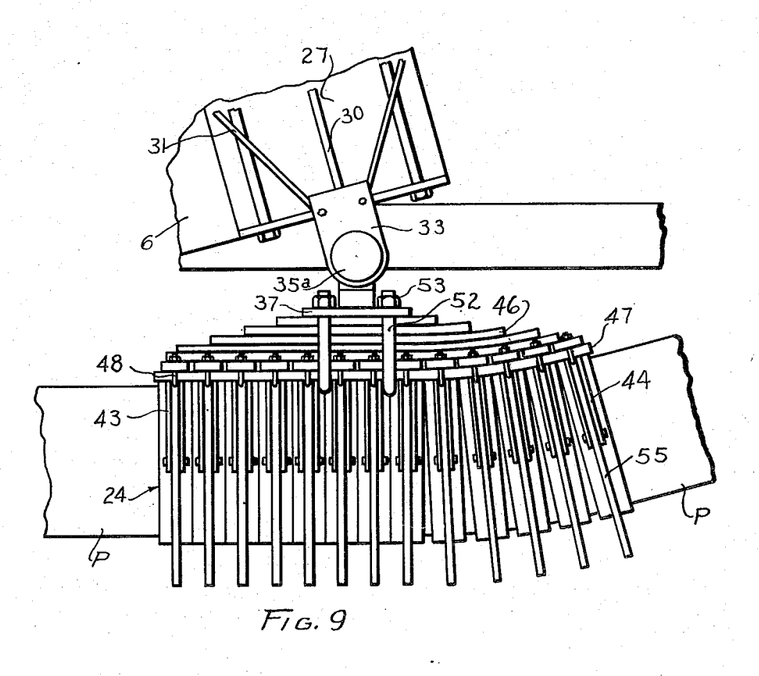
Figure 9 is a plan view showing the bending section in operation.

Furthermore, the bending section may be utilized without the pivotal members pivotally secured to the outer portion of the semi-circular shoe members providing an extra or overall support for the complete circumference of the pipe. The elimination of the pivotal members utilizes only the semi-circular portion of the bending section for supporting the pipe to be bent. This modification may be made in either the preferred or modified embodiments of the apparatus. Furthermore, the particular arrangement of the springs can be varied as desired in that the springs may be disposed between the frame and the bending section wherein all the springs are flush at one end portion (Fig. 9) and with a gradual diminishing length of the successive springs if desired. The number of semi-circular adjacent shoe members may be varied as desired, and similarly the number of sets of shoes in the modification may be increased depending upon the curvature of the bend and the number of bulges or wrinkles desired.

It will thus be seen that the number of springs cooperating with a bending section depends on the stiffness of the pipe, which in turn is dependent upon the diameter and the wall thickness of the pipe. In a bending operation the number of springs may be adjusted to the stiffness of the pipe and the degree of bend may be made without changing the springs as long as the stiffness of the pipe is substantially constant. The number of springs regulate the spread of the bend in the pipe. It will thus be apparent that if there are too few springs, the pipe would have a tendency to bend at one place, while on the other hand, if there are too many springs it will make the bending section too rigid, and cause the pipe to bend at the end of the bending section adjacent the lateral pull. By having more springs adjacent the point of pressure thereby creating more resistance at this point, such as the pivot point for the bending section, it will spread the bend of the pipe to make the curvature more even throughout the full length of the bending shoe section. In this manner the degree of bend will be controlled by how far the end of the pipe is pulled by the traveling block sling.

Changes may be made in the specification and drawings without departing from the spirit of the invention within the scope of the following claims, as set forth.

What I claim is:

1. In a portable pipe bending apparatus comprising a frame, a plurality of pipe contacting shoes pivotally supported by the frame, means for anchoring the pipe to be bent, means for exerting a lateral pull on the pipe to cause a bending thereof against the contacting shoes, a plurality of springs cooperating with the shoes to resist the lateral pull with an increasing force.

2. In a portable pipe bending apparatus comprising a frame, a plurality of pipe contacting shoes pivotally supported by the frame, means for anchoring the pipe to be bent, means for exerting a lateral pull on the pipe to cause a bending thereof against the contacting shoes, and a plurality of springs of varying lengths cooperating with the contacting shoes to resist the lateral pull with an increasing resilient force.

3. In a portable pipe bending apparatus comprising a frame, a bending section comprising a plurality of independent shoes supported by the frame and having a substantially semi-circular portion for contacting the inside portion of the pipe to be bent, means for anchoring the pipe to be bent, means for exerting a lateral pull on the pipe to cause a bending thereof against the contacting shoes adjacent the bending section, and a plurality of springs disposed in progressively diminishing lengths adjacent the back portion of the bending section for resisting the lateral pull with a progressive resilient force.

4. In a pipe bending apparatus comprising a frame, a bending section comprising a plurality of independent shoes supported by the frame and having a substantially semi-circular portion for contacting the inside portion of the pipe to be bent, means for anchoring the pipe to be bent, means for exerting a lateral pull on the pipe to cause a bending thereof against the contacting shoes adjacent the bending section, and a plurality of springs disposed in progressively diminishing lengths adjacent the back portion of the bending section for resisting the lateral pull with a progressively increasing resilient force.

5. In a portable pipe bending apparatus comprising a frame, a bending section supported thereby and comprising a plurality of independent shoes having a substantially semi-circular portion for contacting the inside portion of the pipe to be bent, means for anchoring the pipe to be bent, means for exerting a lateral pull on the pipe to cause a bending thereof against the shoes, a plurality of springs of varying lengths disposed between the frame and the bending shoes to resist the lateral pull with an increasing resilient force.

6. In a pipe bending apparatus comprising a frame, a bending section supported on the frame, means on the frame for anchoring one end of the pipe, means for exerting a lateral pull at another end of the pipe to cause a bending thereof adjacent the bending section, said bending section comprising a plurality of sets of substantially semi-circular shaped shoes adapted to receive the pipe to be bent, said sets of shoes disposed in spaced relationship to provide a recess therebetween for receiving a bulged portion of the pipe during the bending operation, and a plurality of springs of varying length cooperating with the shoes to resist the lateral pull with an increasing resilient force.

7. In a pipe bending apparatus comprising a frame, a bending section supported on the frame, means on the frame for anchoring one end of the pipe, means for exerting a lateral pull at another end of the pipe to cause a bending thereof adjacent the bending section, said bending section comprising a plurality of adjacent shoes of substantially semi-circular configuration for receiving the pipe to be bent, a plurality of superimposed springs cooperating with the shoes, a portion of the springs extending a greater length than the remaining portion, said longer springs adapted to receive a portion of the shoes in spaced relation from the remaining shoes to provide a recess therebetween for receiving a bulged portion of the pipe during the bending operation, said springs cooperating with the shoes to resist the lateral pull with an increasing resilient force and simultaneously permitting movement of one portion of the shoes relative to the other.

8. In a pipe bending apparatus comprising a frame supported on skids, a bending section supported by the frame and comprising a plurality of independent shoes having a substantially semi-circular configuration for contacting the inside portion of the pipe to be bent, means cooperating with the shoes for supporting the annular periphery of the pipe, means for anchoring the pipe to be bent, means for exerting a lateral pull on the pipe to cause a bending thereof around the shoes, a plurality of vertically spaced sets of super-imposed springs of varying lengths disposed between the frame and the bending shoes to resist the lateral pull on the pipe with an increasing resilient force.

CLARENCE L. KELSO.

REFERENCES CITED

The following references are of record in the file of this patent:

UNITED STATES PATENTS

| Number | Name | Date |
| --- | --- | --- |
| 174,609 | Wright | Mar. 7, 1876 |
| 1,079,442 | Rutledge | Nov. 25, 1913 |
| 1,531,653 | Harmon | Mar. 31, 1925 |
| 1,741,840 | Harmon | Dec. 31, 1929 |
| 1,847,943 | Griffin | Mar. 1, 1932 |
| 2,347,593 | Cummings | Apr. 25, 1944 |
| 2,428,764 | Cummings | Oct. 7, 1947 |

FOREIGN PATENTS

| Number | Country | Date |
| --- | --- | --- |
| 2,767 | Great Britain | Sept. 18, 1872 |
| 505,866 | Great Britain | May 18, 1939 |